United States Patent [19]

Barry et al.

[11] Patent Number: 4,531,362

[45] Date of Patent: Jul. 30, 1985

[54] AERODYNAMIC DAMPING OF VIBRATIONS IN ROTOR BLADES

[75] Inventors: Brian Barry, Duffield; Christopher Freeman, Farnsfield, both of England

[73] Assignee: Rolls-Royce Limited, London, England

[21] Appl. No.: 701,644

[22] Filed: Feb. 14, 1985

Related U.S. Application Data

[63] Continuation of Ser. No. 603,738, Apr. 25, 1984, abandoned, which is a continuation of Ser. No. 320,564, Nov. 12, 1981, abandoned.

[30] Foreign Application Priority Data

Dec. 29, 1980 [GB] United Kingdom ............... 8041413

[51] Int. Cl.³ .................................................. F01D 5/26
[52] U.S. Cl. ................................... 60/226.1; 415/119; 416/500
[58] Field of Search ............... 415/119; 181/213, 214, 181/215, 216, 217, 219, 222, 225, 292; 416/500; 60/226.1

[56] References Cited

U.S. PATENT DOCUMENTS

| | | |
|---|---|---|
| 2,225,398 | 12/1940 | Hambun ........................ 415/119 |
| 3,819,009 | 6/1974 | Motsinger ...................... 181/292 |
| 4,106,587 | 8/1978 | Nash et al. ..................... 181/222 |
| 4,122,672 | 10/1978 | Lowrie ............................ 181/222 |
| 4,135,603 | 1/1979 | Dean, III et al. .............. 181/222 |
| 4,150,732 | 4/1979 | Hoch et al. .................... 181/213 |
| 4,231,447 | 11/1980 | Chapman ....................... 181/292 |
| 4,298,090 | 11/1981 | Chapman ....................... 181/292 |

FOREIGN PATENT DOCUMENTS

2344214 3/1974 Fed. Rep. of Germany ...... 181/222

Primary Examiner—Carlton R. Croyle
Assistant Examiner—Jeffrey A. Simenauer
Attorney, Agent, or Firm—Cushman, Darby & Cushman

[57] ABSTRACT

In order to combat flutter in rotor blades rotating within a duct bounded by a duct wall, the duct wall incorporates cavities tuned for resonance to a known flutter frequency. The cavities, which may comprise tubes immediately underlying a facing sheet of the duct wall, are arrayed around the circumference of the duct wall and communicate with the duct through openings in the duct wall near the tips of the blades. Flutter energy from the blades is transferred directly to the cavities by pressure waves and produces resonance in the cavities so that the flutter is damped aerodynamically. The invention is applicable to fans in turbofan engines.

11 Claims, 4 Drawing Figures

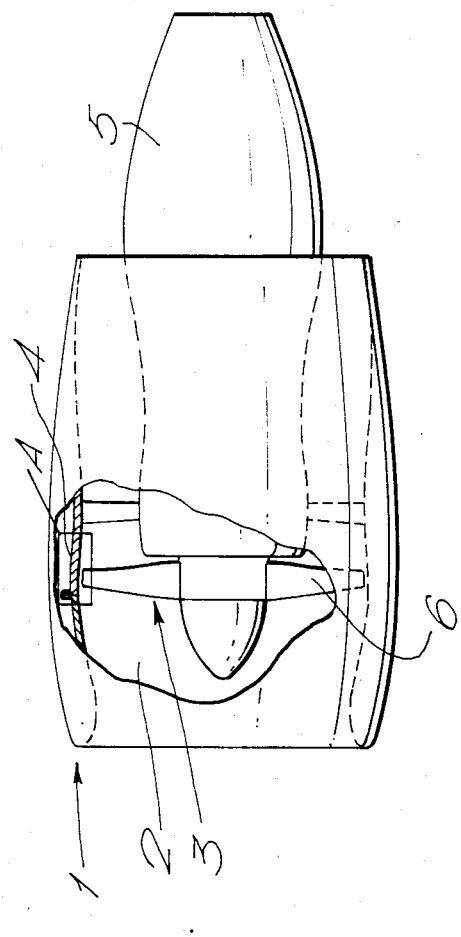
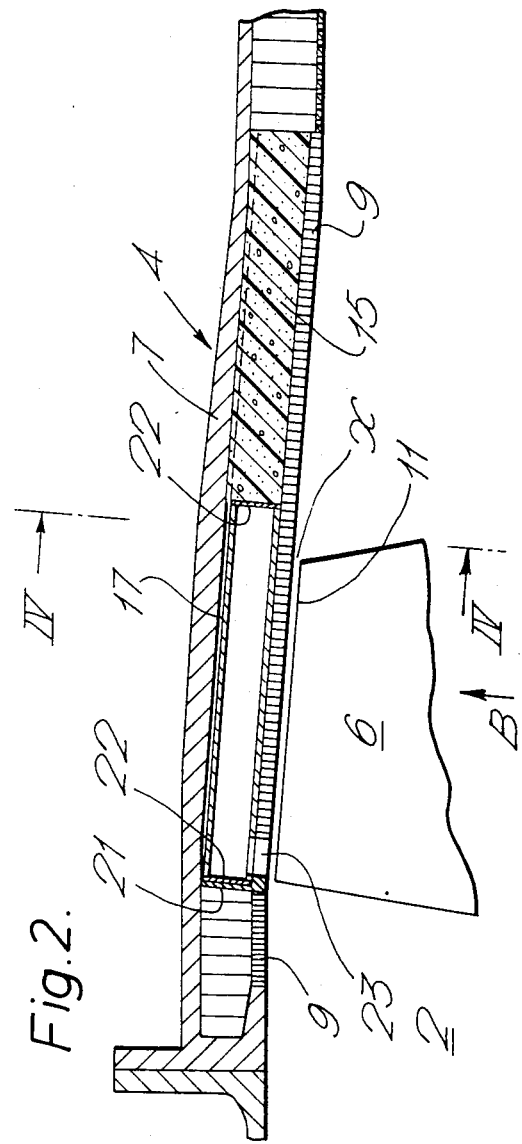

AERODYNAMIC DAMPING OF VIBRATIONS IN ROTOR BLADES

This is a continuation of application Ser. No. 603,738 filed Apr. 25, 1984 which was abandoned upon the filing hereof which was in turn a continuation of application Ser. No. 320,564 filed Nov. 12, 1981 (now abandoned).

The present invention relates to the damping of unwanted vibrations in the blades of a bladed rotor rotating within a duct. It is especially concerned with the damping of flutter in the fan blades of turbofan aeroengines.

Current high by-pass ratio turbofan engines have large diameter front fans within their intake ducts. Consequently the fan blades themselves are large and like other high-speed aerofoils with large spans or chords are subject to the phenomenon known as "flutter". Briefly described, flutter is an aerodynamically excited blade vibration problem with a complex aeroelastic feedback mechanism between the unsteady aerodynamic forces and the blade motion. Insofar as fans in turbofan engines are concerned, flutter only becomes a serious problem at high rotational speeds, when the exciting forces are large.

Flutter of the blades is undesirable because it causes extra stresses in them. In turn, this may necessitate otherwise unnecessary rotational speed restrictions being placed on the fan in order to ensure that the stresses in the blades do not exceed desirable limits. Such restrictions prevent the full performance of the fan being realised, with deleterious effects on available thrust and specific fuel consumption of the engine.

One known way of reducing the effect of flutter is to damp it mechanically, e.g. by fitting the blades with "clappers" part-way along their radial extent, clappers being protrusions on each side of each blade which above a certain rotational speed of the fan bear against neighbouring protrusions on neighbouring fan blades to prevent relative movement between the blades. Unfortunately, clappers or other mechanical means of damping flutter increase the weight and manufacturing cost of the fan blades.

In the present invention flutter amplitudes are reduced without recourse to mechanical damping by ensuring that the flutter is damped aerodynamically by means external to the fan rotor.

Accordingly, the present invention provides a duct wall for an axial gas-flow machine, the machine comprising a bladed rotor mounted for rotation within a duct bounded by said duct wall, the blades of the bladed rotor being subject to flutter and said duct wall incorporating cavities tuner for resonance to a known flutter frequency of the blades, which cavities are arrayed around the circumference of said duct wall and communicate with the duct through openings in said duct wall near the path of the tips of the blades, whereby flutter energy from the blades is transferred directly to the cavities through the gas to produce resonance in the cavities and consequent aerodynamic damping of the flutter in the blades.

The cavities and the openings may be arranged to form tube-type resonators, the cavities being tube-shaped and disposed with their major axes substantially parallel to the extent of the duct wall, each cavity being connected to the duct by one of the openings, each said opening being in the side of the cavity at one end thereof. Preferably, the length of the tube-shaped cavities is effectively one quarter of the wavelength of the known flutter frequency, whereby when the cavities resonate at said frequency the pressure-waves at the openings of the tubes are one half of one wavelength out of phase with the incoming pressure waves due to the flutter in the blades, some damping therefore being achieved by partial cancellation of the incoming pressure waves.

Preferably, the cavities are disposed with their major axes extending in a substantially axial direction and are arranged in sets of, say, four, the members of each set being staggered in the axial direction with respect to each other so that the openings are axially spaced from each other across the path of the tips of the blades. Thus, the opening of a first cavity in each set is positioned near the path of the leading edges of the blades and the opening of a last cavity in each set is positioned near the path of the trailing edges of the blades, the openings of the other cavities in each set being positioned at intermediate positions between said paths of said leading and trailing edges.

The invention includes an axial gas-flow machine, such as a turbofan aeroengine, incorporating a duct wall constructed in the above-mentioned manner.

Other aspects of the invention will be apparent from the following description and claims.

An embodiment of the invention will now be described, by way of example only, with reference to the accompanying drawings in which:

FIG. 1 is a general view of a turbofan aeroengine incorporating the invention, the engine being shown partly cut-away to reveal the fan and a cross-section of the fan duct wall;

FIG. 2 is an enlargement of the area A in FIG. 1, showing means for effecting aerodynamic damping of fan blade flutter according to the invention;

Figure 3:
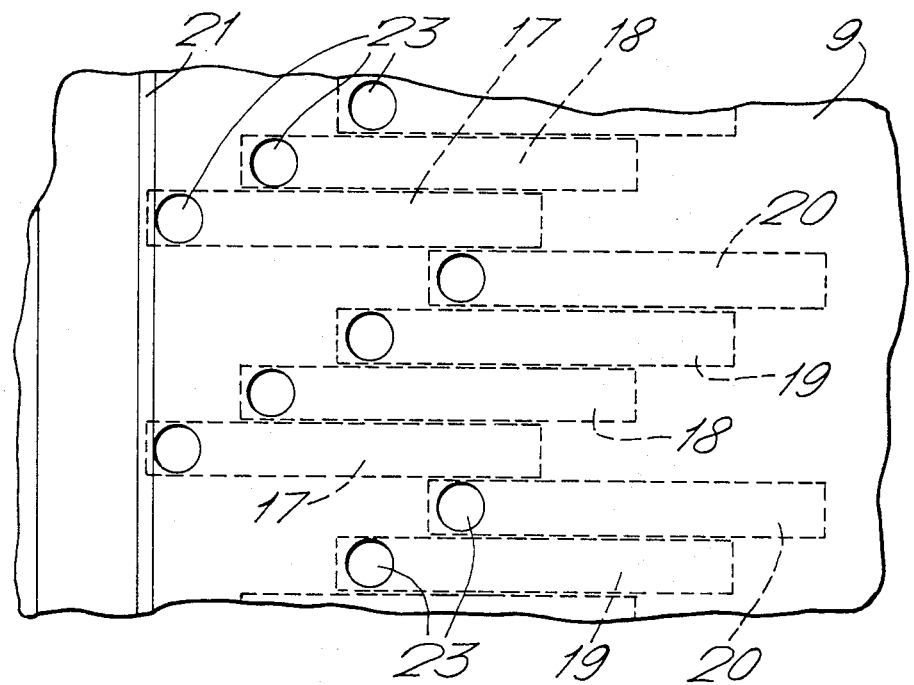
FIG. 3 is a developed view on arrow B in FIG. 2.

The drawings are not to scale.

Referring to FIG. 1, a turbofan aeroengine 1 comprises a ducted fan 3 and an engine core 5. Apart from the modifications in the duct wall 4 due to the invention, the construction and operation of such engines are well known and will not be described further except as relevant to the invention. An operational example of such engines is the RB211 (Registered Trade Mark) series of engines manufactured by Rolls-Royce Limited.

The fan 3 comprises a bladed rotor which rotates within the duct 2 bounded by duct wall 4. The fan blades 6 are subject to flutter at high rotational speeds, as discussed previously. Note that although this flutter produces pressure waves in the flow of air past the fan blades 6, these pressure waves, unlike fan-induced noise, tend to be non-propagating within duct 2 and are therefore not manifest as noise in the far field. They are distinguished from the various types of fan-induced propagating noise not only by this characteristic of non-propagation, but also by the fact that flutter frequencies tend to be much lower than the noise frequencies which engineers are normally concerned to combat in the intakes of turbofan engines.

Unlike the noise caused by the passage of the fan blades through the air, flutter is an aeroelastic problem, aeroelasticity being defined as the interaction of aerodynamic forces and the elastic reactions of the aerofoil. It can therefore be ameliorated by taking some of the flutter (vibrational) energy from the blades, i.e. by damping their elastic response to the exciting forces. By the present invention, means are incorporated in the duct wall 4 to damp the flutter aerodynamically.

Figure 4:
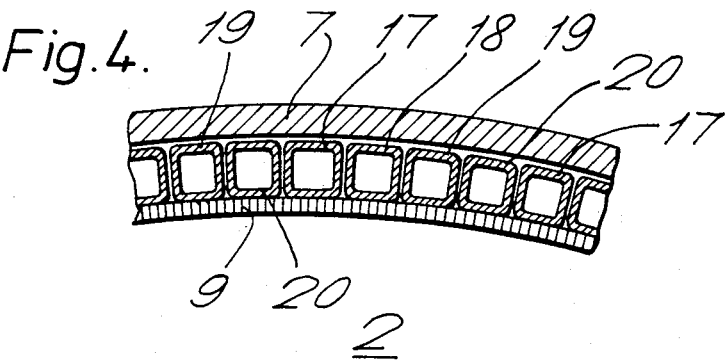
FIG. 4 is a cross-sectional view on line IV—IV in FIG. 2.

The structure of the duct wall 4 is shown in more detail in FIGS. 2 and 4, where it will be seen that it acutually comprises several layer, of which the radially outermost layer is the fan casing 7, this being the main structural member. The radially innermost layer is an abradable lining 9 against which the tips 11 of fan blades 6 can safely rub if clearance x becomes too small. Sandwiched between the casing 7 and the abradable lining 9 is an adhesive filler material 15 such as a foamed epoxy resin or polyurethane foam. Also sandwiched between casing 7 and lining 9 are sets of resonator tubes, and in FIGS. 3 and 4 the members of each set are labelled 17–20. The tubes are in fact embedded in the filler material 15 and held thereby. The forward ends of tubes 17 are held by and located from the flanged ring 21 which is fixed by welding to casing 7. Both ends of the tubes 20 are closed off by end walls 22.

By the invention, the resonator tubes 17–20 form cavities which are tuned to resonate to a known troublesome flutter frequency, communication between the duct 2 and the interior of the tubes being by suitable openings in the duct wall, i.e. large holes or "mouths" 23 formed through both the abradable lining 9 and the sides of the tubes near their forward ends. In order to ensure resonance and maximum aerodynamic damping, the length of the tubes is effectively $\frac{1}{4}$-wavelength of the troublesome flutter frequency, so that when the tubes resonate to that frequency the pressure waves at the mouths of the tubes are $\frac{1}{2}$-wavelength out of phase with the incoming pressure waves caused by the flutter, damping therefore being achieved not only by degradation of energy in propagation and reflection of the waves in the tubes, but also by partial cancellation of the incoming pressure waves at the mouths 23 of the tubes.

As can be seen from FIGS. 2 and 3, the tubes 17–20 are oriented so that their major axes extend in a generally axial direction with respect to the fan rotor. The tubes lie parallel to the abradable lining 9 in the region of the blade tips 11 and are directly under that lining. They are arranged right around the periphery of the fan duct in identical sets of four, the members of each set 17–20 being staggered in the axial direction with respect to each other so that the mouth 23 of the foremost tube 17 in each set is situated near the path of the leading edges of the blades 6, and the mouth 23 of the rearmost tube 20 in each set is situated near the path of the trailing edges of the blades, the mouths of tubes 18 and 19 being situated at equally spaced intermediate positions between the leading and trailing edge of the blades. By this arrangement, the mouths 23, besides being circumferentially spaced from each other by virtue of the arrangement of the tubes around the periphery of the duct wall, are also axially spaced from each other across the path of the tips of the blades so that flutter is evenly damped over the extent of the blade chord. It would be possible to have an alternative arrangement of curved tubes with their major axes extending circumferentially instead of axially, but this arrangement would not be so efficient since greater circumferential spacing between mouths 23 would be necessary, thus reducing the total number of mouths which can be provided.

Although in the present embodiment of the invention the tubes are arranged in sets of four, plainly sets of three, five or other numbers could be employed, their mouths being once again spaced across the blade chord.

For some flutter modes, it is possible that unequal spacing of the mouths across the blade chord would be more suitable than equal spacing.

As shown clearly in FIG. 4, the tubes 17–20 are of square cross-section, but many other cross-sections could be utilised, such as circular or rectangular. Furthermore, although the resonator cavities are shown as formed by discrete tubes, it would be possible to utilise a corrugated metal or plastic sheet sandwiched between casing 7 and lining 9 to achieve tubular resonator cavities, closed-ended tubes being produced by inserting partitions at appropriate points along the lengths of the channels formed by the corrugations. In the illustrated embodiment, the tubes 17–20 are made of extruded aluminium alloy or plastic for lightness and their end walls 22 are aluminium blanking plates which are fixed to the ends of the tubes by a suitable adhesive. If desired, the blanking plates may be provided with small dust holes (not shown) so that any dust finding its way into the tubes 17–20 can escape. Air and dust particles vented from the tubes through these small holes would be exhausted back into the fan duct 2 through other small holes (not shown) in the abradable lining 9. The dust holes are not large enough to significantly alter the resonator characteristics of the tubes.

In designing embodiments for putting the invention into effect, the following points should be borne in mind:

(a) The resonator cavities should be tuned to resonate to the basic flutter frequency. For example, if the basic flutter frequency is 500 Hz, the tubes in FIGS. 1 to 4 should be about 165 mm long. Their cross-section should also be sufficiently large (e.g. about 15 mm $\times$ 15 mm) to allow a strong standing wave to develop within them.

(b) Preferably, as described above, the mouths of the resonator cavities should be situated within that area of the duct wall which is swept by the chord of the fan blades. However, it might be possible to obtain sufficient damping of the flutter even if the mouths of the cavities were situated very near the fan upstream and downstream of it. Extra damping might be achieved if extra cavities were provided having mouths just upstream or downstream of the fan. Note that the effectiveness of the invention depends upon there being a direct transfer of vibrational energy from the blades through the air gap x to the resonator cavities, where the vibrations are damped. It is therefore clear that the mouths of the cavities cannot be situated very far from the fan, otherwise there will be no such direct transfer of energy.

(c) The mouths of the resonator cavities collectively form the "open area" of that section of the duct wall which they occupy. A large open area is desirable from the point of view of allowing a large proportion of the pressure wave energy to be transferred from the duct to the cavities. However, to achieve good damping of the resonance a small open area is desirable, so a trade-off between these two requirements must be made. For the configuration shown in FIGS. 2 to 4, an open area of about 17% of the area swept by the chord of the fan has been deemed to be suitable.

(d) Although FIGS. 2 to 4 and the associated description relate to tube-type resonators, it should be understood that Helmholtz-type resonators could be substituted to achieve similar damping effects.

(e) Although the figures and the associated description relate to a fan duct wall in a turbofan aeroengine, the invention is applicable to the damping of flutter in the blades of other ducted rotors, such as in compressors or turbines, whether running in air or other gases.

We claim:

1. An axial gas flow machine comprising: a duct wall bounding a duct, a rotor having blades mounted thereon for rotation within said duct, said blades being subject to a flutter at a known flutter frequency, said flutter giving rise to non-propagating pressure waves of less frequency than pressure waves of far field noise frequencies in gas flow past said blades, said blades during said rotation having radially outer tips which sweep out a path adjacent said duct wall as said rotor rotates, said path having a leading edge and a trailing edge defined with respect to said gas flow and corresponding respectively to leading edges and trailing edges of said blades, said duct wall having openings therein which openings are circumferentially spaced around said duct at least radially adjacent said path of said radially outer tips of said blades, said duct wall further incorporating resonator cavities tuned for resonance to said known flutter frequency, each one of said cavities being in communication with said duct by a corresponding one of said openings, whereby flutter energy from said radially outer tips of said blades is transferred by said non-propagating pressure waves directly into said cavities substantially only as the tips of said blades pass said openings, resonance being produced in said cavities with consequent aerodynamic damping of said flutter in said blades.

2. An axial gas flow machine as claimed in claim 1 in which said openings are spaced from each other across said path of said radially outer tips of said blades between said leading and trailing edges of said path.

3. An axial gas flow machine as claimed in claim 1 in which said cavities are arranged in sets, whereby one cavity in each one of said sets communicates with said duct by one of said openings located near said leading edge of said path, and another cavity in each one of said sets communicates with said duct by one of said openings located near said trailing edge of said path.

4. An axial gas flow machine as claimed in claim 3 in which there are several cavities in each set thereof, the arrangement being such that further cavities in each one of said sets communicate with said duct by corresponding openings located at intermediate positions between said leading and trailing edges of said path.

5. An axial gas flow machine as claimed in claim 1 in which said resonator cavities and said openings in said duct wall are tube-type resonators.

6. An axial gas flow machine as claimed in claim 1, wherein said duct wall is a fan duct wall of a turbofan aeroengine.

7. An axial gas flow machine comprising: a duct wall bounding a duct, a rotor having blades mounted thereon for rotation within said duct, said blades being subject to a flutter at a known flutter frequency, said flutter giving rise to non-propagating pressure waves of less frequency than pressure waves of far field noise frequencies in gas flow past said blades, said blades during rotation having radially outer tips which sweep out a path adjacent said duct wall as said rotor rotates, said path having a leading edge and a trailing edge defined with respect to said gas flow and corresponding respectively to leading edges and trailing edges of said blades, said duct wall having openings therein which openings are circumferentially spaced around said duct at least radially adjacent to said path of said radially outer tips of said blades, said duct wall further incorporating resonator cavities tuned for resonance to said known flutter frequency, each one of said cavities being tube-shaped and in communication with said duct by a corresponding one of said openings at an extremity thereof, said tube-shaped cavities being disposed with their major axes extending substantially parallel to the extent of said duct wall and substantially in an axial direction of the axial gas flow machine, each of said tube-shaped cavities further having lengths effectively one quarter of a wave length of said known flutter frequency whereby when said cavities resonate at said known flutter frequency, said non-propagating resonant pressure waves at said openings of said tube-shaped cavities are one-half of one wave length out of phase with incoming non-propagating pressure waves caused by said flutter in said blades thereby causing aerodynamic dampening of said flutter to be achieved by partial cancellation of said incoming non-propagating pressure waves.

8. An axial gas flow machine as claimed in claim 7 in which said cavities are arranged in sets, members of each one of said sets being staggered in the axial direction with respect to each other whereby a first cavity in each set communicates with said duct by a corresponding one of said openings located near said edge of said path and a last cavity in each set communicates with said duct by a corresponding one of said openings located near said trailing edge of said path, and further cavities in each set communicating with said duct by corresponding ones of said openings located at positions intermediate said leading and trailing edges of said path.

9. An axial gas flow machine as claimed in claim 8 in which there are four cavities in each set thereof.

10. An axial gas flow machine as claimed in claim 7 in which said cavities are of substantially square cross section.

11. An axial gas flow machine as claimed in claim 7 in which said cavities comprise pre-formed discrete tubes embedded in said duct all.

* * * * *